United States Patent [19]

Miller

[11] 4,167,195

[45] Sep. 11, 1979

[54] VALVE

[75] Inventor: Don R. Miller, Ashland, Ohio

[73] Assignee: U-Brand Corporation, Ashland, Ohio

[21] Appl. No.: 835,637

[22] Filed: Sep. 22, 1977

[51] Int. Cl.$^2$ .............................................. F16K 1/48
[52] U.S. Cl. ...................................... 137/269; 251/88; 251/333; 251/357
[58] Field of Search ................... 251/333, 357, 88, 358; 137/329.06, 329.01, 269

[56] References Cited

U.S. PATENT DOCUMENTS

| | | | |
|---|---|---|---|
| 2,121,315 | 6/1938 | Black | 251/88 |
| 2,194,961 | 3/1940 | Walker | 251/357 X |
| 2,272,351 | 2/1942 | Polcari | 251/333 X |
| 2,936,776 | 5/1960 | Veatch | 251/333 X |
| 3,123,337 | 3/1964 | Peras | 251/333 |
| 3,892,383 | 7/1975 | Hesse | 251/357 X |
| 3,904,174 | 9/1975 | Giese | 251/333 X |

FOREIGN PATENT DOCUMENTS 486723  6/1938  United Kingdom ................ 137/329.06

*Primary Examiner*—Arnold Rosenthal
*Attorney, Agent, or Firm*—Isler & Ornstein

[57] ABSTRACT

A straight compression valve is disclosed in which shutoff of flow of fluid is effected between surfaces of plastic material, but in which a washer of non-metallic material may be employed under certain conditions. When the washer is not used, the design of the sealing surfaces is such as to obtain a highly effective shutoff with a minimum of closing pressure, while avoiding breakage of parts of the valve adjacent the sealing surfaces. Means are provided for controlling the movement of the valve stem to prevent breakage of the valve bonnet and other parts during closing of the valve. The valve body is provided with flats or flat surfaces which are so disposed or positioned in relation to the valve as a whole as to enable the valve to be clamped in a vise for facilitating access to the stem and other parts of the valve. The use of packing glands is avoided through the use of an O-ring and its structural location in the valve.

4 Claims, 10 Drawing Figures

VALVE

BACKGROUND OF THE INVENTION

The present invention relates generally to valves of the straight compression type, which are designed to be used without washers, but which, under certain conditions, may be used with the addition of a washer.

Prior to about 1960, the use of plastics or plastic materials in the construction of valves was virtually unkown, and valves, faucets, and the like, were made of metals or metallic materials, the surfaces of which had to be ground to achieve even a fairly serviceable seal.

In order to improve the seal, it was customary to use washers made of rubber, plastic, or other non-metallic material, but such washers, due to wear or distortion or for other reasons, required frequent replacement.

Examples of the use of such washers are found in the Higgins et al U.S. Pat. No. 1,886,677 and the Weaver U.S. Pat. No. 1,097,492.

In the Higgins et al U.S. Pat. No. 1,886,677, a valve structure is disclosed, in which a "stepped" opening connects the inlet and outlet openings of the valve, said opening comprising an aperture 18 which opens into an inlet passage 12 and a larger aperture 20 opening into the outlet passage 14. A ledge 22 is provided between these apertures, upon which the valve unit is adapted to seat. A valve stem 26 is threaded into the body 10 of the valve and has secured to the lower extremity thereof, by means of a screw 28, a packing washer 30.

When the valve stem is forced downwardly, the packing washer is forced to seat upon the ledge or seat 22. The head of the screw 28 is of a diameter and thickness just sufficient to completely fill the aperture 18 when the packing washer 30 is seated on the ledge 22.

It is stated, in the aforesaid patent, that the pressure in the water supply line is entirely taken up before reaching the washer 30 by virtue of the fact that the head of the screw 28 completely closes the opening 18. It is further stated that inasmuch as practically no pressure reaches the valve seat 22, there is no necessity for grinding this seat to enable the valve, when seated, to completely close the passage and prevent leakage.

The statement that the head of the screw 28 completely closes the aperture 18 is tantamount to stating that in order to obtain a good seal, it is required that the head of the screw be made to precise or exact dimensions in order to obtain a shutoff, and that the omission of the screw will not provide a proper shutoff.

Moreover, since, as stated in the patent, the washer 30 is made of leather, rubber, or some other resilient or yieldable material, and the seat 22 is an unground surface, it must be concluded that this washer is necessary, and that the valve stem, in the absence of the washer, will not prevent leakage of the valve.

In the Weaver U.S. Pat. No. 1,097,492, a faucet is disclosed, in which the faucet casing 11 has an inlet end 12 and an outlet end 13, and a valve seat 14 is formed between the inlet and outlet. The valve stem 16 has a head 17, to which a washer 20 is secured by a screw 21. The washer 20 is adapted to be seated on the seat 14.

It is not apparent, in the Weaver patent, that a leak-proof seal can be obtained without the use of the Washer 20, which is obviously made of a soft, non-metallic material.

In the Greene et al U.S. Pat. No. 3,386,700, an example of a faucet type valve is shown, made substantially in its entirety of resilient plastic material, in which the valve stem is provided with a tapered cone or plug portion which is designed to coact with a conical seat on the body of the valve to effect closure of the valve.

Due to the inclination of the tapered cone or plug and the conical seat, it was found that it was difficult to effect a leak-proof, positive shutoff of the valve.

Moreover, due to the inclination of the tapered cone, and the absence of a flat surface on the lower end of the cone, it was found to be impossible to utilize a washer in conjunction with the stem of the valve.

SUMMARY OF THE INVENTION

The present invention has as its primary object, the provision of a valve which is made virtually in its entirety of a plastic or plastic material, and in which a positive shutoff or closure of the valve is achieved without the use of a washer, but in which a washer may be employed under certain conditions.

Another object of the invention is to provide a valve of the character described, in which no grinding of the valve parts is required in order to achieve said positive shutoff, or to prevent or minimize leakage.

Another object of the invention is to provide a valve of the character described, comprising a valve body and valve stem of plastic material, in which the stem is utilized under certain conditions, without a washer, to close the valve, and under other conditions, in combination with a washer, to close the valve.

Another object of the invention is to provide a valve of the character described, comprising a valve body having a plurality of valve seats therein, one of said seats being of conical configuration and the other being an annular flat surface disposed about the larger end of said conical seat.

Another object of the invention is to provide a valve of the character described, comprising a valve body having a seat therein, and a valve stem having a seating end adapted for seating on said seat, said body and stem being of a hard plastic material, whereby when said stem is seated on said seat, the stem is compressed by said seat to conform the stem to said seat.

A further object of the invention is to provide a valve of the character described, comprising a valve body, a valve stem, and a bonnet, secured to the valve body, the valve body being provided with means to prevent over tightening of the bonnet and, thus, prevent breakage of the bonnet.

A further object of the invention is to provide a valve of the character described, comprising a valve body having an upright stem-receiving portion, and branches extending laterally from said body, the branches having external parallel flat surfaces adapted to be clamped in a vise or the like, whereby to position said upright portion in a manner to facilitate access thereto and to said stem for replacement or repair purposes.

A still further object of the invention is to provide a valve of the character described, in which an O-ring is employed to provide a seal between the bonnet and valve stem, and the use of packing glands is not required for sealing purposes.

Other objects and advantages of the invention will appear in the following description, wherein like numerals are used to designate like parts.

BRIEF DESCRIPTION OF THE DRAWINGS

A presently preferred embodiment of the invention will now be described in connection with the drawings, in which.

DESCRIPTION OF THE PREFERRED EMBODIMENT

Figure 1:
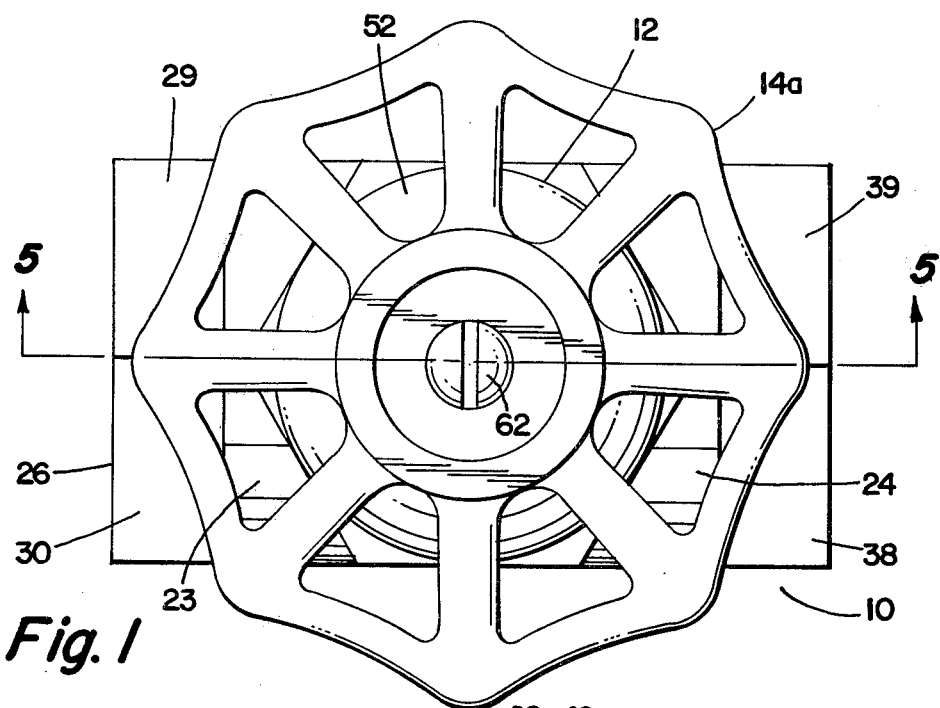
FIG. 1 is a top plan view of a straight compression valve embodying the invention.
Figure 2:
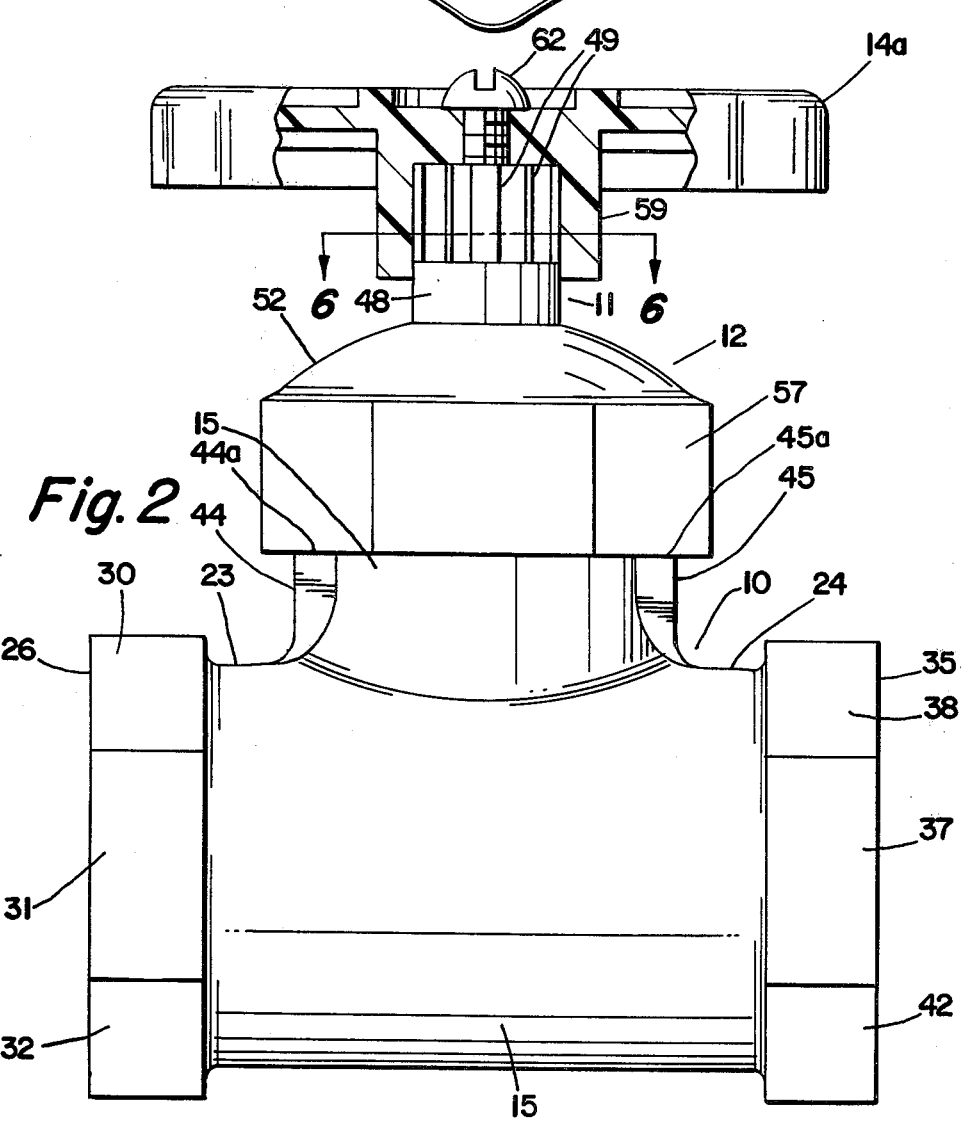
FIG. 2 is a side elevational view of the valve, as viewed from the lower end of FIG. 1, but with a portion broken away to show the connection of the handwheel to the stem.
Figures 3, 4:
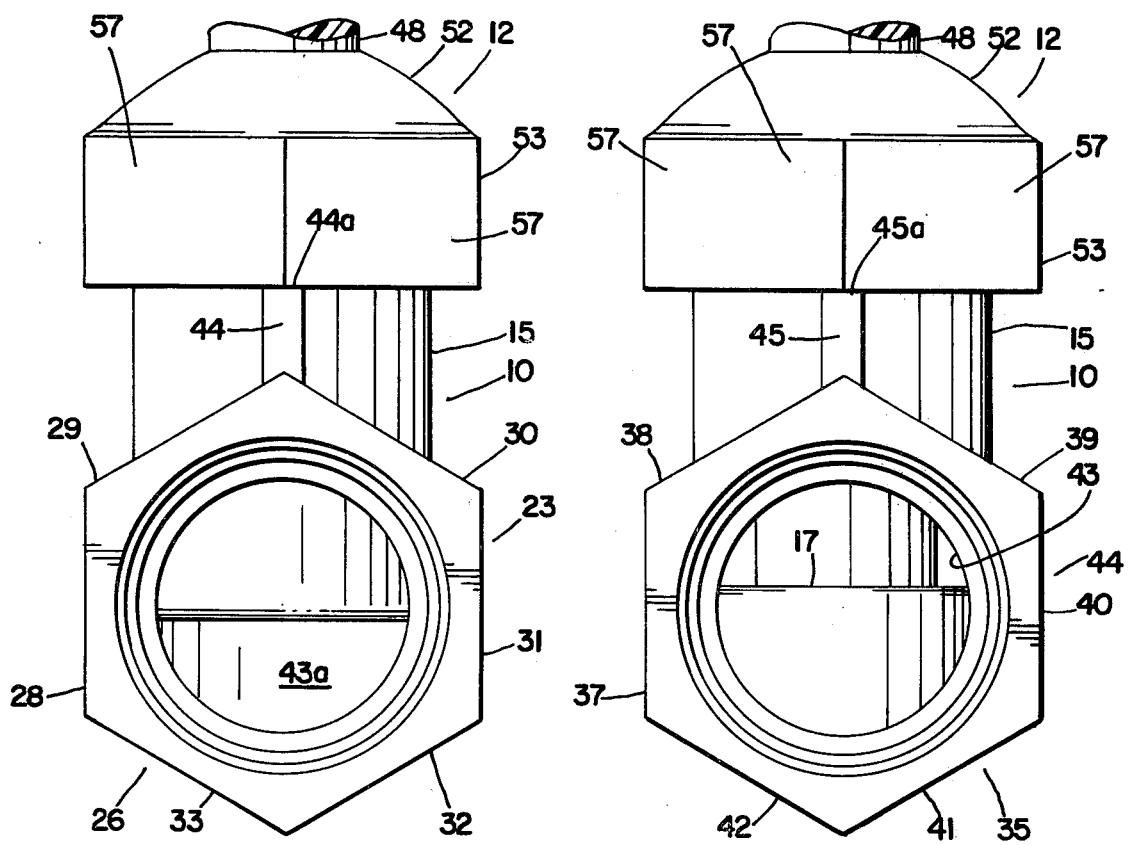
FIG. 3 is a fragmentary end elevational view of the valve, as viewed from the left end of FIG. 2.
FIG. 4 is a fragmentary end elevational view of the valve, as viewed from the right end of FIG. 2.
Figure 5:
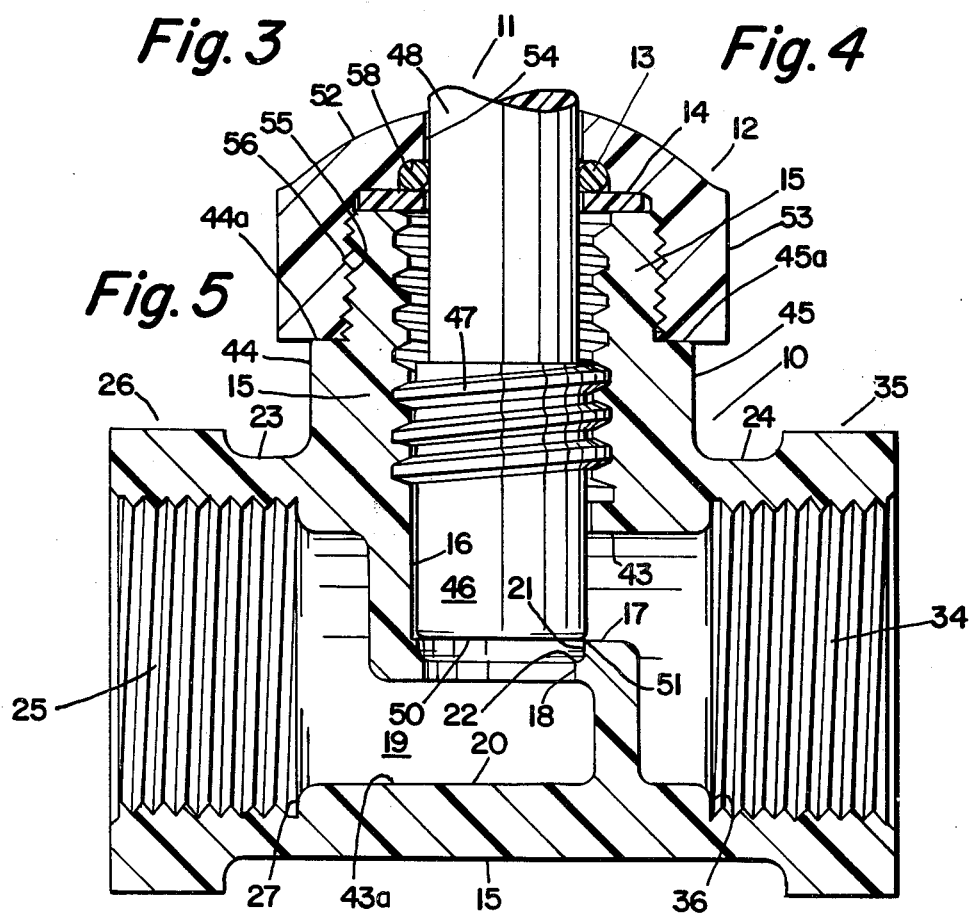
FIG. 5 is a fragmentary cross-sectional view of the valve, taken on the line 5—5 of FIG. 1, with the valve in partially open or unseated position.
Figure 6:
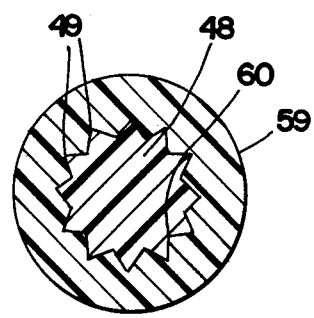
FIG. 6 is a cross-sectional view, taken on the line 6—6 of FIG. 2.

Referring more particularly to FIGS. 1 to 6 inclusive of the drawings, a straight compression valve is shown, comprising a valve body 10, a stem and valving member 11, a bonnet 12, an O-ring 13, a washer 14, and a handwheel or operating handle 14a.

The valve body 10 is molded, in one piece, of a thermoplastic to provide a vertically disposed central body portion 15 having an internally-threaded stem and valving member receiving chamber 16, which terminates, at its lower end, in a flat, upwardly facing bottom 17.

The central body portion 15 is also provided with a cylindrical flow passage 18 of reduced diameter, which passage is concentric with and continues downwardly from the bottom 17 of the chamber 16 and communicates with a flow chamber 19 having a cylindrical wall 20. The central body portion 10 includes a conical valve seat 21, which interconnects the flat bottom 17 with the flow passage 18, and terminates, at its lower end, in an annular surface 22 of arcuate cross-section.

In a typical example, the stem-receiving chamber 16 has a diameter of 0.625", the conical valve seat 21 is inclined at an angle of 11° to the axis of the chamber 16, the annular surface 22 has a radius of 0.020", the flow passage 18 has a diameter of 0.475", and the combined height of the seat 21, surface 22, and flow passage 18 is 0.125".

The body 10 further includes flow inlet and outlet portions 23 and 24 which are formed integrally with the central body portion 15 and projecting horizontally from the lower end portion of said central portion and from diametrically-opposite sides of the latter.

The inlet portion 23 is shown as being in the nature of an elongate, cylindrical boss projecting from the left hand side of the central portion 15, and as provided with an internally-threaded socket 25 to cooperatively receive the threaded end of a supply pipe (not shown). The portion 23 of the body 10 is further provided with a polygonal tool engaging enlargement 26 at its outer terminal end portion for facilitating engagement and/or removal of the body from a supply pipe. The socket 25 terminates at a flat bottom 27 at that part or portion of the construction where the portion 23 joins the central portion 15 of the body 10.

It may be noted, in this instance, that the outer surface of the enlargement 26 is of hexagonal cross-section, consisting of six flats, 28, 29, 30, 31, 32 and 33, with the flats 28 and 31 disposed in parallel vertical planes, which are parallel with a vertical plane in which the axis of the body portion 15 and the axis of the inlet portion 23 lie. The advantage of this disposition of the flats will be presently explained.

The outlet portion 24 is similarly shown as being in the nature of an elongate cylindrical boss projecting from the right hand side of the central portion 15, and as provided with an internally-threaded socket 34 to cooperatively receive the threaded end of an outlet pipe (not shown). The portion 24 of the body 10 is further provided with a polygonal tool engaging enlargement 35 at its outer terminal end portion for facilitating engagement and/or removal of the body from the outlet pipe. The socket 34 terminates at a flat bottom 36 at that part or portion of the construction where the portion 24 joins the central portion 15 of the body 10.

The outer surface of the enlargement 35 is also of hexagonal cross-section, consisting of six flats, 37, 38, 39, 40, 41 and 42, with the flats 37 and 40 disposed in parallel vertical planes which are parallel with the vertical plane in which the axis of the body portion 15 and the axis of the outlet portion 24 lie. The flat 37, in other words, is coplanar with the flat 31, and the flat 40 is coplanar with the flat 28. The advantage of this disposition of the flats will be presently explained.

The body portion 15 is also provided with an outlet flow port 43, which is disposed above the level of the bottom 17, and establishes communication between the chamber 16 and the outlet portion 24 of the valve body.

The body 10 is provided with an inlet flow port 43a which establishes communication between the inlet portion 23 of the valve and the flow chamber 19.

The central portion 15 of the body 10 is provided at diametrically-opposite sides thereof with radially-projecting, vertically extending ribs 44 and 45, which have flat surfaces 44a and 45a at their upper ends, and extend downwardly to the inlet and outlet portions 23 and 24 respectively of the valve body. These ribs form stops, the function of which will be presently explained.

The stem and valving member 11 of the valve is also molded, in one piece, of a thermoplastic. It has an elongate lower portion 46 having a cylindrical outer surface, the upper portion of which is provided with external threads 47, which are in threaded engagement with the threads in the stem-receiving chamber 16 of the central body portion 15 of the valve. It also has an elongate upper portion 48 of reduced diameter extending upwardly from the central portion of the portion 46, and provided at its upper end with a multiplicity of circumferentially-spaced splines 49.

An important feature of the invention resides in the fact that the stem 11, in contradistinction to other plastic valves in which the stem is provided with a conical seating plug at its lower end, has a flat seating surface 50, which surface is perpendicular to the axis of the stem, and is joined at its periphery to the cylindrical surface of the portion 46 of the stem by an annular surface 51, of arcuate cross-section, having a radius of 0.020" (corresponding to the radius of the annular surface 22 at the lower end of the conical valve seat 21). In other words, the diameter of the surface 50, including the surface 51, is the same as the diameter of the upper end of the conical valve seat 21.

This provides several advantages, as follows:

(a) As pressure is exerted onto the stem 11, the stem enters the conical seat 21, with continued movement of the stem causing the surface 51 to enter into the annular surface 22 at the lower end of the conical valve seat.

(b) Due to the slight inclination (11°) of the conical valve seat 21, the pressure applied by the stem 11, in order to bring the surface 51 into sealing engagement with the surface 22, and thus effect a positive shutoff, need not be excessive.

(c) Since the stem and valve seat are made of a thermoplastic material, and not of metal, the stem and seat will flow under compression, and thus provide a positive, leak-proof, shutoff. In other words, the physical properties of thermoplastics are utilized to achieve a leak-proof seal.

(d) Through the use of thermoplastic material for the stem and valve seat, a serviceable valve is provided, in all cases where the valve is used for the flow therethrough of liquids which are of such a nature as to be incompatible with a washer, where a washer is employed in combination with a stem.

The bonnet 12 of the valve is also molded, in one piece, of a thermoplastic, and comprises an upper dome-like portion 52 and a lower annular collar portion 53 depending from the portion 52.

The portion 52 has a central aperture 54 through which the portion 48 of the stem freely extends, while the collar portion 53 is internally threaded, as at 55, for threaded engagement with threads 56 of the central body portion 15 of the valve body 10.

The collar portion 53 of the bonnet is of polygonal external configuration, providing a plurality of tool engaging flats 57 about its exterior for facilitating attachment of the bonnet to the valve body.

The upper portion of the bonnet defines a downwardly facing annular recess 58, in which the O-ring 13 is disposed, the O-ring being retained in said recess by means of the molded or die-cut plastic washer 14 which is disposed between the upper end of the central body portion 15 of the valve body and the lower end of the bonnet portion 52.

The handwheel or operating handle 44a is also molded, in one piece, of a thermoplastic, and is provided with a depending annular collar 59, provided internally with splines 60, whereby the splines 60 may be interfitted with the splines 49 on the stem 11, for the purpose of enabling the stem to be rotated by the handwheel 14a to open or close the valve.

The handwheel is attached to the stem 11 by means of a screw 61.

In those applications, in which the liquids flowing through the valve, as, for example, water, are compatible with washers which are normally used in such compression valves, or where it becomes necessary to use such a washer, due to damage or injury to the valve stem or valve seat, provision is made for the use of such washers, in combination with the valve stem, as already stated.

Figure 7:
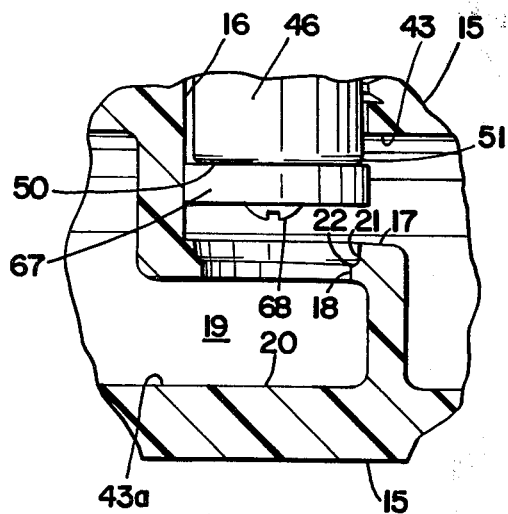
FIG. 7 is a fragmentary cross-sectional view, similar to FIG. 5, but showing the use of a washer on the stem, with the valve in open position.
Figure 8:
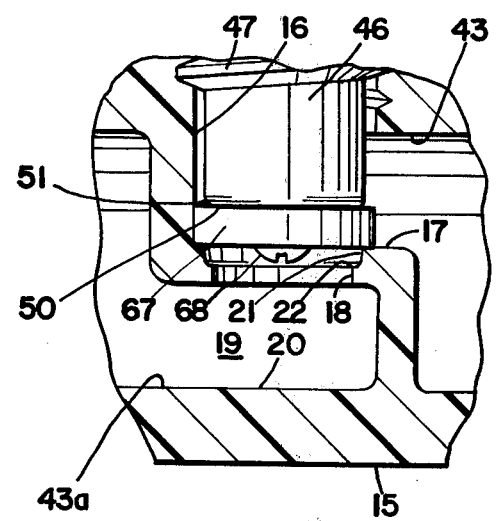
FIG. 8 is a view similar to FIG. 7, but with the valve in closed position.
Figure 9:
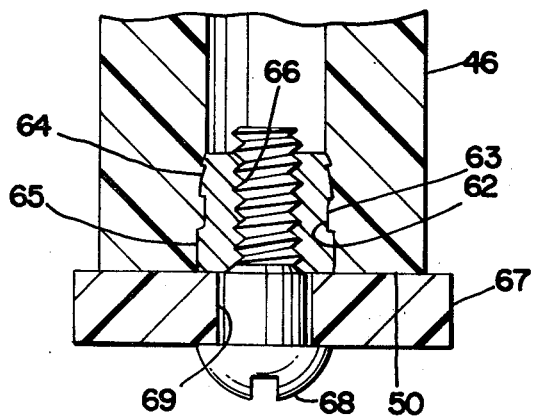
FIG. 9 is a fragmentary cross-sectional view of the stem in FIGS. 7 and 8, showing the connection of the washer to the stem.
Figure 10:
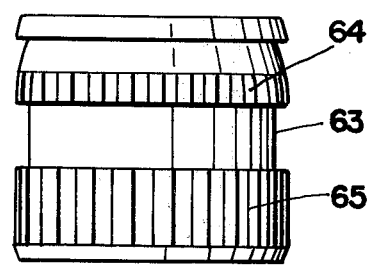
FIG. 10 is a side elevational view, on greatly enlarged scale, of the Ultrasert nut shown in cross-section in FIG. 9.

Such provision is shown in FIGS. 7, 8, 9 and 10 of the drawings.

For this purpose, the valve stem 11 is provided in its lower end with a centrally disposed substantially conical socket 62, in which a fastener 63 is frictionally secured.

The fastener 63 is a nut-like substantially conical element, made of brass, and available commercially under the name Ultrasert II (Heli-Coil) 8-32-6035-2BRO.185, and provided with circumferentially spaced splines 64 and 65, so that the element may be pressed into the socket 62, and the splines thereof forced into the wall of the socket, to thereby position the element within the socket, and against displacement from the stem both axially and circumferentially.

The element 63 is provided with an internally threaded axial bore 66.

Secured to the flat surface 50 of the stem 11 is a flat washer 67, made of Neoprene, and in this instance, has an external diameter of 0.625", and a height or thickness of 0.125". This diameter, in other words, is substantially the same as the diameter of the stem-receiving chamber 16, or slightly greater than the diameter of the lower portion 46 of the stem 11.

The washer 67 is secured to the surface 50 of the stem 11 by means of a machine screw 68, which extends through the hole 69 in the washer, and is threaded into the threaded axial bore 66 of the element 63.

It may be noted, at this point, that the portion of the stem of the screw 68 immediately above the head of the screw, and for a distance equivalent to the thickness of the washer 67, is left unthreaded, for a reason to be presently explained.

Since the washer is of a diameter greater than the diameter of the upper end of the conical valve seat 21, the washer cannot enter this valve seat when the valve is closed, but, instead, the washer seats on the flat upwardly facing bottom 17 of the valve body, to thereby effectively close the valve.

The function of the ribs 44 and 45 is to provide a positive stop for the bonnet 12, when the valve is being closed, to prevent over tightening of the bonnet, and, thus, prevent breakage of the bonnet. These ribs also serve to strengthen the portion 15 of the body 10.

The disposition of the O-ring 13 is such that it may be replaced when the valve is in the closed position. Moreover, the O-ring, in this case, obviates the need for a packing gland which is customarily found in valves of this type.

The bonnet 12 is a screw-over bonnet, which is easily accessible for assembling the valve components, in contrast to bonnets which have concealed or enclosed portions and are not readily accessible.

The valve provides a double seat arrangement, that is to say, it can be used with and without a washer, thereby providing a valve of low cost.

Due to the disposition of the flats 28, 31, 37 and 40 in planes which are parallel with a plane passing through the vertical axis of the portion 45 of the body and the axis of the inlet and outlet portions of the valve, the valve may be clamped in a vise of fixture with the stem and adjacent portions of the valve in a vertical position, in which repairs or replacements can easily and quickly be made.

Since the stem does not have a pocket or recess in which the washer is retained or received, a good seal is always made, in contrast to the situation where such a pocket or recess is formed in the end of the stem and a good seal cannot be effected.

Since that portion of the stem of the screw 68 which passes through the hole 69 in the washer 67 is left unthreaded (see FIG. 9), when the stem 46 is rotated to close the valve, the washer remains stationary during such rotation, and cannot, therefore, become damaged or distorted or torn.

The conical seat 12 may vary to some extent in its conicity in relation to the axis of the stem, from an angle of about 5° to an angle of about 15°, with 11° being an optimum angle.

Although the valve body has been described as provided with threaded ends 25 and 34 (FIG. 5), it is to be understood that socketed (unthreaded) ends may be used, instead.

It is also to be understood that the seat and stem arrangement which has been described may also be used in hose bibbs, boiler drains, sink faucets, angle valves and sill cocks.

Although the invention has been described with reference to a valve in which both the body and stem of the valve are made of a thermoplastic or plastic material, it is to be understood that the body of the valve may be made of a plastic and the stem of metal or a metallic material, or the body of the valve may be made of a metal or metallic material, and the stem of a plastic or plastic material, or the body and stem both made of a metal or metallic material. In some cases, some or all of the parts may be made of a combination of plastic and metal.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a valve of the character described, a valve body, a valve stem mounted in said body for reciprocal movement therein, said stem being of cylindrical configuration and terminating at its lower end in a flat surface perpendicular to the axis of said stem, an internally threaded metallic element frictionally secured within the lower central portion of said stem, a washer of nonmetallic material disposed in contact with said flat surface, and a screw for securing said washer to said flat surface, said screw being threadedly secured to said element.

2. A valve, as defined in claim 1, wherein said washer is of greater diameter than the lower end of said stem.

3. In a valve of the character described, a valve body, a plurality of valve seats in said body, one of said seats being conical and the other a flat annular surface extending outwardly from one end of said conical seat, and lying in a plane perpendicular to the axis of said conical seat, a valve stem mounted in said valve body for reciprocal movement towards and away from said seats, said stem terminating at its lower end in a flat surface perpendicular to the axis of said conical seat and of substantially the same diameter as the larger end of said conical seat, and the peripherial edge of which is movable into said conical seat to close the valve, and a washer adapted for securement to said lower end of said stem and of a larger diameter than the larger end of said conical seat and adapted for engagement with the other of said seats to close the valve, when the peripheral edge of said flat surface is not used to close the valve.

4. A valve, as defined in claim 3, wherein said valve body and said valve stem are of a plastic material.

* * * * *